United States Patent Office 3,328,462
Patented June 27, 1967

3,328,462
S-CHLORO-ISOTHIOCARBAMYL CHLORIDES
AND THEIR PREPARATION
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed May 25, 1964, Ser. No. 370,051
20 Claims. (Cl. 260—543)

This invention relates to S-chloro-isothiocarbamyl chlorides and to a process for preparing these compounds. This application is a continuation-in-part of our copending application Ser. No. 354,789, filed Mar. 25, 1964, and now abandoned.

The reaction of isothiocyanates with chlorine to provide isocyanide dichlorides is well known. These preparations apparently proceed in accordance with the following equation wherein phenyl isothiocyanate, for example, is used as a starting reactant.

$$C_6H_5NCS + \rightarrow 2Cl_2 \rightarrow C_6H_5NCCl_2 + SCl_2$$

It has been proposed that an unstable chloro-addition product is first formed in thte reaction of phenyl isothiocyanate with chlorine, and that this intermediate is subsequently converted by further chlorination to the desired isocyanide dichloride. For instance, G. Malcolm Dyson and Thomas Harrington in J. Chem. Soc. (London), 1940, 191, and 1942, 151, investigated the reaction of phenyl isothiocyanate with chlorine and have postulated the intermediate formation of a compound having the structure

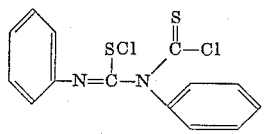

prior to formation of the phenyl isocyanide dichloride. This proposed intermediate was not isolated and characterized due to its extreme instability.

However, it has now been found that N-phenyl S-chloro-isothiocarbamyl chloride is an intermediate in the preparation of phenyl isocyanide dichloride by the chlorination of phenyl isothiocyanate. Surprisingly, this intermediate is stable if handled properly, and it can be isolated by utilizing the process disclosed herein. As a result of this discovery, a series of S-chloro-isothiocarbamyl chlorides having the following general formula has been provided:

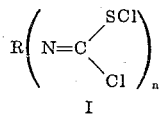

I wherein R is phenyl, tolyl, xylyl, phenyl having a lower alkoxy substituent, halogenated phenyl, nitrated phenyl, alkyl having 1–18 carbon atoms and aralkyl; and $n$ is an integer from 1–2. As used in the specification and claims herein, lower alkoxy is a substituent having 1–3 carbon atoms.

The compounds (I) are provided by the reaction of the corresponding isothiocyanates and diisothiocyanates with a substantially equivalent amount of chlorine under controlled process conditions. The term "equivalent amount of chlorine" as used in the specification and claims herein is understood to represent an equimolar amount of chlorine when monoisothiocyanates are utilized as starting reactants and two moles of chlorine for each mole of beginning diisothiocyanate utilized in the process.

Since the S-chloro-isothiocarbamyl chlorides are sensitive to heat whereby the corresponding isothiocyanates and isocyanide dichlorides are formed, the prepartion of the chlorides (I) in accordance with the process disclosed herein should be performed at temperatures below about 30° C. in order to minimize chloride degradation. Preferably, the chlorinations should be carried out below 20° for best results.

An inert solvent must also be employed in the preparation of the derivatives (I). Any organic solvent in which the beginning isothiocyanate and chlorine are soluble but which is not itself susceptible to reaction with chlorine is suitably used in the process. However, it has been found that chlorinated hydrocarbons such as $CHCl_3$, $CCl_4$, $C_2H_2Cl_4$, etc., are particularly useful solvents. Solvents of this nature boiling at less than about 125° C. are especially useful since they can be removed from the reaction mixture in vacuo at low temperatures.

As mentioned in the preceding discussion, the S-chloro-isothiocarbamyl chlorides are heat sensitive, but they are surprisingly stable if handled carefully. The oily members of the series can be successfully distilled only in ultra high vacuum, but the solid members can be readily recrystallized from low boiling aliphatic hydrocarbons such as pentane or hexane. The products are highly reactive and sensitive to moisture, but they are stable on storage when moisture is completely excluded.

In general, it may be stated that those derivatives (I) wherein R represents an alkyl group are somewhat more sensitive to degradation than those derivatives where R is phenyl or substituted phenyl. However with proper precautions, these derivatives (R=alkyl) are provided in good purity. It has been found that the S-chloro-isothiocarbamyl chlorides (I) wherein R is an aralkyl group are the most susceptible to decomposition of the compounds disclosed herein.

The process disclosed herein does not involve complicated procedures. The addition of chlorine is always terminated when one mole of chlorine has been introduced for each —NCS group in the beginning reactant. This point always coincides with the point at which the —NCS absorption disappears from the IR-spectrum of the reaction mixture. The isolation of the S-chloro-isothiocarbamyl chlorides present no special problems, and conventional procedures involving filtrations, washings, distillations, recrystallizations, etc., are conveniently utilized to obtain most of the products described herein. However, as hereinbefore mentioned, the derivatives (I) wherein R is alkyl are somewhat more unstable than the phenyl substituted derivatives, and it has been found that these products cannot be distilled or recrystallized. In spite of this fact, they have still been obtained in good purity.

A convenient purification procedure which may be utilized to obtain the chlorides in high purity is based on the fact that they are very miscible with aliphatic hydrocarbons such as pentane, hexane, etc., as well as with mixtures of these hydrocarbons and the chlorinated hydrocarbons utilized as solvents in the reaction process. However, all impurities and secondary reaction products obtained in this reaction are completely insoluble in the aforementioned solvents, and thus can be removed from the reaction system.

Beginning reactants which can be converted to the S-chloroisothiocarbamyl chlorides (I) in accordance with the process of this invention are represented by the formula $R(NCS)_n$ wherein R and n are as previously represented. The isothiocyanate reactants are available and are conveniently provided by conventional methods as, for instance, by reacting the corresponding isocyanates with phosphorus pentasulfide or by reacting the corresponding amines with thiophosgene. Examples of the isothiocyanates which can be employed in the preparation of the chlorides (I) include phenyl, tolyl, 2,6-xylyl, o-bromophenyl, m-bromophenyl, p-bromophenyl, 3-bromotolyl, o-chlorophenyl, m-chlorophenyl, p-chlorophenyl, 2,4-dibromophenyl, 2,5-dichlorophenyl, p-fluorophenyl, p-methoxyphenyl, m-propoxyphenyl, o-nitrophenyl, m-nitrophenyl, p-nitrophenyl, methyl, ethyl, propyl, isopropyl, butyl, isobutyl, n-hexyl, sec. hexyl, 3-hexyl, n-heptyl, 4-heptyl, n-octyl, iso-octyl, 2-ethylhexyl, n-nonyl, n-decyl, n-dodecyl, 4-butyloctyl, n-tridecyl, n-octadecyl, phenethyl, benzyl, and m-methoxybenzyl isothiocyanates.

Included in the diisothiocyanates which may be reacted with chlorine to give chlorides of the general Formula I are p-phenylene, toluene 2,4-, ethylene, propylene, butylene, hexamethylene, octamethylene, decamethylene, and trimethylpentylene diisothiocyanates.

The following examples will serve to illustrate the preparation of several S-chloro-isothiocarbamyl chlorides in accordance with the process of this invention.

EXAMPLE 1

A 250 ml. three necked flask, equipped with gas inlet tube, stirrer, thermometer and a Dry Ice condenser was charged with 67.6 g. (0.5 mole) of phenyl isothiocyanate and 67 ml. of chloroform. An amount of 35.5 g. (0.5 mole) of chlorine gas was passed into this solution at a rate of 7.0 to 7.5 grams per hour while the solution was effectively stirred and a reaction temperature of 15° to 18° C. was maintained. After the addition of chlorine was completed, the yellow reaction solution was stored for 14 to 20 hours at −20° to −30° C. A small amount of a fluffy precipitate was then filtered from the reaction mixture. The chloroform was removed from the filtrate in vacuo at temperatures not exceeding 20° C. The remaining yellow oil was mixed with 350 ml. of dry ether, and another small portion of a yellow precipitate was removed by filtration. The ether was removed from the filtrate in vacuo at temperatures not exceeding 20° C., and the residual oil was then mixed with 400–500 ml. of n-hexane. A small amount of solid precipitate was removed from this mixture by filtration and the n-hexane was removed from the filtrate in vacuo under 20° C. A clear yellow liquid in the amount of 94.5 g. (91.5% yield) was thus obtained. The following analytical data revealed that the desired N-phenyl S-chloro-isothiocarbamyl chloride had been obtained in high purity.

Analysis.—Calcd. for $C_7H_5Cl_2NS$: C, 40.79; H, 2.44; Cl, 34.45; N, 6.87; S, 15.52. Found: C, 40.78; H, 2.42; Cl, 34.40; N, 6.89; S, 15.44.

Molecular weight by cryoscopic procedure.—Calcd. for $C_7H_5Cl_2NS$: 206.12. Found: 206.0.

EXAMPLE 2

A solution of 36.0 g. (0.187 mole) of p-phenylene diisothiocyanate in 325 ml. of chloroform was treated with 26.6 g. (0.374 mole) of chlorine under conditions described in Example 1. The reaction mixture was allowed to stand for 14 to 20 hours at −20° to −30° C., and was then filtered from minute amounts of a precipitate. The solvent was removed from the filtrate in vacuo at a temperature not exceeding 20° C. The remaining crystalline solid amoutned to 61.2 g. (97.8% of theoretical yield). This material was recrystallized from n-hexane to provide 43.0 g. of a yellow crystalline product melting at 82°–83° C. The following analytical data revealed that the desired N,N'-p-phenylene-bis (S-chloro-isothiocarbamyl chloride) had been obtained in high purity.

Analysis.—Calcd. for $C_8H_4Cl_4N_2S_2$: C, 28.75; H, 1.21; Cl, 42.49; N, 8.38; S, 19.15. Found: C, 28.99; H, 1.30; Cl, 42.6; N, 8.36; S, 19.24.

EXAMPLE 3

A solution of 61.8 g. (0.3 mole) of toluene-2,4-diisothiocyanate in 75 ml. of chloroform was treated with 42.6 g. (0.6 mole) of chlorine using the procedure of Example 1. The reaction mixture was allowed to stand overnight, and after this period extensive crystallization had occurred. The reaction mixture was filtered under a nitrogen atmosphere, and a yellow solid was obtained and dried. This solid was dissolved in 500 ml. of warm n-hexane, and a small portion of an insoluble solid material was filtered from the mixture. The clear filtrate was then cooled whereupon a yellow solid precipitated from solution. This solid was filtered and dried, and there was thus obtained 67.5 g. of a yellow needlelike solid having a melting point of 75°–75.5° C. The following analytical data revealed that the desired N,N'-tolylene-2,4-bis (S-chloro-isothiocarbamyl chloride) had been obtained in high purity. Yield: 65%.

Analysis.—Calcd. for $C_9H_6Cl_4N_2S_2$: C, 31.05; H, 1.74; Cl, 40.78; N, 8.05; S, 18.38. Found: C, 31.08; H, 1.83; Cl, 41.2; N, 8.02; S, 18.88.

EXAMPLE 4

Amounts of 102.0 g. (0.6 mole of 4-chlorophenyl isothiocyanate and 43.0 g. (0.6 mole) of chlorine were reacted in 125 ml. of chloroform as described in Example 1. After reaction was complete, the solvent was removed in vacuo at about 10° C.

After removal of the chloroform, 140 grams of a crude reaction product was obtained in the form of a yellow oil. It was dissolved in 300 ml. of dry n-pentane at room temperature; the solution was treated with charcoal, filtered, and stored at −20° C. From this solution, pure N-(4-chlorophenyl) S-chloro-isothiocarbamyl chloride precipitated in the form of yellow needles and was separated by filtration. Upon concentration of the filtrate to one third of its original volume, an additional amount of the pure compound was obtained. A total amount of 130.6 g. (90.5% yield) of pure N-(4-chlorophenyl) S-chloro-isothiocarbamyl chloride, M.P. 38.5°–39.5° C., was obtained.

Analysis.—Calcd. for $C_7H_4Cl_3NS$: C, 34.94; H, 1.68; Cl, 44.26; N, 5.83; S, 13.30. Found: C, 35.11; H, 1.63; Cl, 44.1; N, 5.89; S, 13.49.

EXAMPLE 5

Amounts of 102.0 g. (0.5 mole) of 2,5-dichlorophenyl isothiocyanate and 35.5 g. (0.5 mole) of chlorine were reacted in 125 ml. of chloroform as described in Example 4. The reaction provided 132 g. of crude reaction product in the form of a straw-yellow oil which was dissolved in 700 ml. of dry n-pentane. The solution was treated with charcoal at room temperature, filtered, and cooled to −50° C. The precipitate thus obtained was separated by decanting the solvent from the crystalline product which was once more recrystallized from n-pentane. The N-(2,5-dichlorophenyl) S-chloro-isothiocarbamyl chloride thus obtained amount to 98 g. (71.3% yield) and melted at 31° C.

Analysis.—Calcd. for $C_7H_3Cl_4NS$: C, 30.56; H, 1.10; Cl, 51.61; N, 5.10; S, 11.60. Found: C, 30.87; H, 1.35; Cl, 51.18; N, 5.03; S, 11.28.

An additional amount of 30.3 g. of slightly less pure product was obtained from the mother liquor of the recrystallizations.

EXAMPLE 6

Amounts of 39.0 g. (0.236 mole) of 4-methoxyphenyl isothiocyanate and 16.8 g. (0.237 mole) of chlorine were reacted in 75 ml. of chloroform as described in Example 4, except that a reaction temperature of 0° C. was strictly maintained. After the reaction was complete, a small amount of a fluffy solid was filtered from the orange colored reaction solution. The reaction solution was then mixed with 500 ml. of dry n-pentane, and a red colored tar precipitated from solution and was removed by filtration. The residual yellow filtrate was concentrated, and the oily residue was dissolved in 250 ml. of dry n-pentane. This solution was again filtered, and all solvent was then removed in vacuo to afford 26.0 g. (46.7% yield) of N-

(4-methoxyphenyl) S-chloro-isothiocarbamyl chloride in the form of a yellow oil; $n_D^{27}$ 1.6251.

EXAMPLE 7

Amounts of 39.0 g. (0.216 mole) of 4-nitrophenyl isothiocyanate and 15.4 g. (0.217 mole) of chlorine were reacted in 200 ml. of chloroform as described in Example 4, affording a yellow colored clear solution from which the solvent was removed by distillation in vacuo with a bath temperature not exceeding 20° C. The resulting oily residue was dissolved in 200 ml. of dry ether, and a small amount of an insoluble fluffy precipitate was filtered from the mixture. The ether was removed in vacuo leaving 50.0 g. of a light yellow crystalline residue which was purified by two recrystallizations from n-pentane. This operation was carried out in such a manner that the crude product was dissolved in 500 ml. of n-pentane at 25° C., filtered and then cooled to −15° C. The crystalline precipitate was collected by filtration affording 38 g. (70.0% yield) of N-(4-nitrophenyl) S-chloro-isothiocarbamyl chloride, M.P. 49° C.

*Analysis.*—Calcd. for $C_7H_4Cl_2N_2O_2S$: C, 33.48; H, 1.61; Cl, 28.27; N, 11.16; S, 12.76. Found: C, 34.21; H, 1.60; Cl, 27.7; N, 11.58; S, 12.89.

EXAMPLE 8

Amounts of 53.0 g. (0.608 mole) of ethyl isothiocyanate and 43.3 g. (0.61 mole) of chlorine were reacted in 75 ml. of chloroform at −10° C. as described in Example 1. After chlorine addition was completed, the reaction solution was immediately diluted by 300 ml. of n-pentane which had been cooled to −10° C. The precipitate which formed was removed by filtration, and the filtrate was concentrated to remove both chloroform and pentane. The oil thus obtained was dissolved in 200 ml. of fresh pentane and filtered again. Concentration of the filtrate in vacuo at 0°–5° C. afforded 31.5 g. (33% yield) of N-ethyl S-chloro-isothiocarbamyl chloride in the form of a yellow liquid.

*Analysis.*—Calcd. for $C_3H_5Cl_2NS$: C, 22.79; H, 3.18; N, 8.86; Cl, 45.00. Found: C, 23.18; H, 3.28; N, 8.45; Cl, 46.00.

EXAMPLE 9

Amounts of 46.1 g. (0.4 mole) of n-butyl isothiocyanate and 28.4 g. (0.4 mole) of chlorine were reacted in 50 ml. of chloroform at −10° C. as described in Example 1. After chlorine addition was completed, the reaction solution was placed in an ice water bath at 0° C. and chloroform was removed in vacuo while dry nitrogen was passed through a capillary into the reaction solution. Then, the crude reaction product (69.5 g. of yellow oil) was immediately thereafter mixed with 200 ml. of dry n-hexane, and the resulting solution separated from an insoluble oil. Concentration of this solution in vacuo afforded 35 g. (47% yield) of a yellow oil ($n_D^{24}$ 1.5219). Infrared and elemental analysis revealed that the desired N-(n-butyl) S-chloro-isothiocarbamyl chloride had been obtained.

*Analysis.*—Calcd. for $C_5H_9Cl_2NS$: C, 32.79; H, 4.88; N, 7.53. Found: C, 32.55; H, 5.15; N, 7.02.

EXAMPLE 10

Amounts of 78.0 g. (0.495 mole) of n-heptyl isothiocyanate and 35.4 g. (0.498 mole) of chlorine were reacted in 110 ml. of chloroform and worked up as described in Example 8. An amount of 42.0 g. (37.0% yield) of N-(n-heptyl) S-chloro-isothiocarbamyl chloride, identified by infrared analysis, was obtained.

EXAMPLE 11

Amounts of 50.0 g. (0.36 mole) of phenethyl isothiocyanate and 21.8 g. (0.37 mole) of chlorine were reacted in 75 ml. of chloroform as described in Example 1. The chloroform was removed from the reaction mixture in vacuo, and the residual yellow liquid was mixed with 200 ml. of n-pentane. A small amount of insoluble solid was filtered from solution, and the n-pentane was removed in vacuo leaving 26 g. (36.2% yield) of N-phenethyl S-chloro-isothiocarbamyl chloride in the form of a yellow liquid.

The S-chloro-isothiocarbamyl chlorides disclosed herein are useful as cross linking agents in rubber chemistry particularly when used with urethane and butadiene-styrene type rubbers. However, because these derivatives are particularly reactive with olefinic bonds, they are especially attractive accelerators when used in conjunction with normal curing agents such as sulfur in rubber curing applications. It has been found that the use of these derivatives also enhances the oxidative stability of the cured rubber products.

The derivatives (I) are also useful as herbicides in the controlling of various noxious weeds. They are also effective as nematocides, and it has also been found that they are useful soil fungicides and fumigants.

What is claimed is:

1. S-chloro-isothiocarbamyl chlorides having the formula

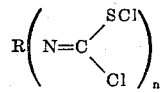

wherein R is selected from the class consisting of phenyl, tolyl, xylyl, phenyl having a lower alkoxy substituent, halogenated phenyl, nitrated phenyl, and alkyl having 1–18 carbon atoms; and wherein *n* is an integer from 1–2.

2. S-chloro-isothiocarbamyl chlorides having the formula

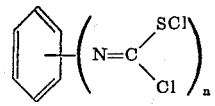

wherein *n* is an integer from 1–2.

3. N-phenyl S-chloro-isothiocarbamyl chloride.

4. N,N′-p-phenylene-bis(S-chloro-isothiocarbamyl chloride).

5. S-chloro-isothiocarbamyl chlorides having the formula

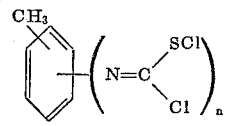

wherein *n* is an integer from 1–2.

6. N,N′-tolylene-2,4-bis(S-chloro-isothiocarbamyl chloride).

7. S-chloro-isothiocarbamyl chlorides having the formula

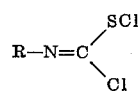

wherein R is halogenated phenyl.

8. N-(4-chlorophenyl) S-chloro-isothiocarbamyl chloride.

9. N-(2,5-dichlorophenyl) S-chloro-isothiocarbamyl chloride.

10. S-chloro-isothiocarbamyl chlorides having the formula

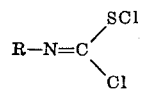

wherein R is phenyl having a lower alkoxy substituent.

11. N-(4-methoxyphenyl) S-chloro-isothiocarbamyl chloride.

12. S-chloro-isothiocarbamyl chlorides having the formula

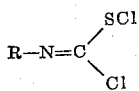

wherein R is nitrated phenyl.

13. N-(4-nitrophenyl) S-chloro-isothiocarbamyl chloride.

14. S-chloro-isothiocarbamyl chlorides having the formula

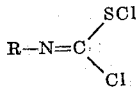

wherein R is alkyl having 1–18 carbon atoms.

15. N-(n-butyl) S-chloro-isothiocarbamyl chloride.
16. N-(n-heptyl) S-chloro-isothiocarbamyl chloride.
17. N-ethyl S-chloro-isothiocarbamyl chloride.
18. A process for the preparation of S-chloro-isothiocarbamyl chlorides which comprises reacting (a) isothiocyanates having the formula $R(NCS)_n$ wherein R is selected from the class consisting of phenyl, tolyl, xylyl, phenyl having a lower alkoxy substituent, halogenated phenyl, nitrated phenyl, and alkyl having 1–18 carbon atoms; and wherein $n$ is an integer from 1–2, with (b) a substantially equivalent amount of chlorine at a temperature below about 30° C. in the presence of an inert solvent.

19. The process of claim 18 wherein a chlorinated hydrocarbon having a boiling point of less than about 125° C. is utilized as the inert solvent.

20. The process of claim 18 wherein a reaction temperature of less than 20° C. is employed.

References Cited

Helmers, O., Berichte deut. Chem., vol. 20, pages 776–791 (1887).

LORRAINE A. WEINBERGER, *Primary Examiner.*

HAROLD C. WEGNER, *Assistant Examiner.*